Inventor
William J. Wise and
Thomas O. Adams

Feb. 3, 1925. 1,524,899
W. J. WISE ET AL
MOTOR FRAME
Filed Nov. 23, 1921   5 Sheets-Sheet 5

Inventor
William J. Wise and
Thomas O. Adams
By Freast and Bond
Attorney

Patented Feb. 3, 1925.

1,524,899

UNITED STATES PATENT OFFICE.

WILLIAM J. WISE AND THOMAS O. ADAMS, OF NEW PHILADELPHIA, OHIO, ASSIGNORS TO THE WISE-McCLUNG MANUFACTURING COMPANY, OF NEW PHILADELPHIA, OHIO, A CORPORATION OF OHIO.

MOTOR FRAME.

Application filed November 23, 1921. Serial No. 517,396.

*To all whom it may concern:*

Be it known that we, WILLIAM J. WISE and THOMAS O. ADAMS, citizens of the United States, both residing at New Philadelphia, in the county of Tuscarawas and State of Ohio, have invented a new and useful Motor Frame, of which the following is a specification.

This invention relates to a motor frame and more particularly to a frame designed for electric motors such as are used in suction cleaners.

The objects of the invention are to provide a frame supported upon the base plate of the motor casing upon which the motor is completely assembled and in condition for operation before the cover or dome of the motor case is placed thereon; which is especially desirable in motors for suction cleaners, as the motor may be assembled completely and thoroughly inspected before the cover is placed thereon, and as the upper bearing for the armature of the motor is not carried in the cover, access may be easily had to the motor for repairs or examination of the different parts thereof by removing the cover, the entire motor being assembled within the frame.

The above and other objects are attained by forming posts upon the base plate of the motor, the lower or inner bearing for the armature being carried upon the base plate, a removable frame being supported upon said posts and carrying the field core and brushes, and the upper or outer bearing of the armature, this frame being attached to the posts upon the base plate by screws.

A preferred embodiment of the invention thus set forth in general terms, is illustrated in the accompanying drawings, in which—

Figure 1:
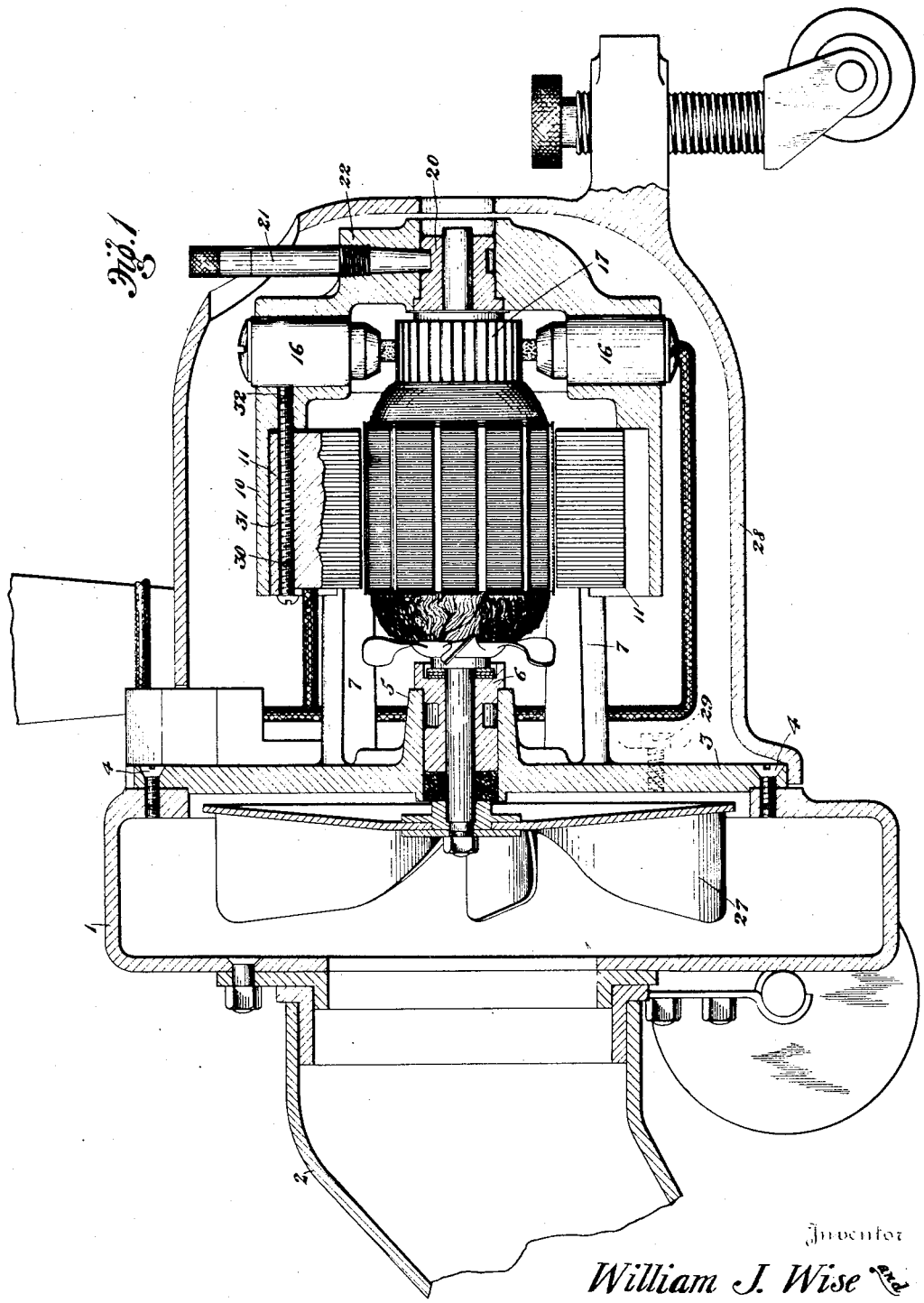
Figure 2:
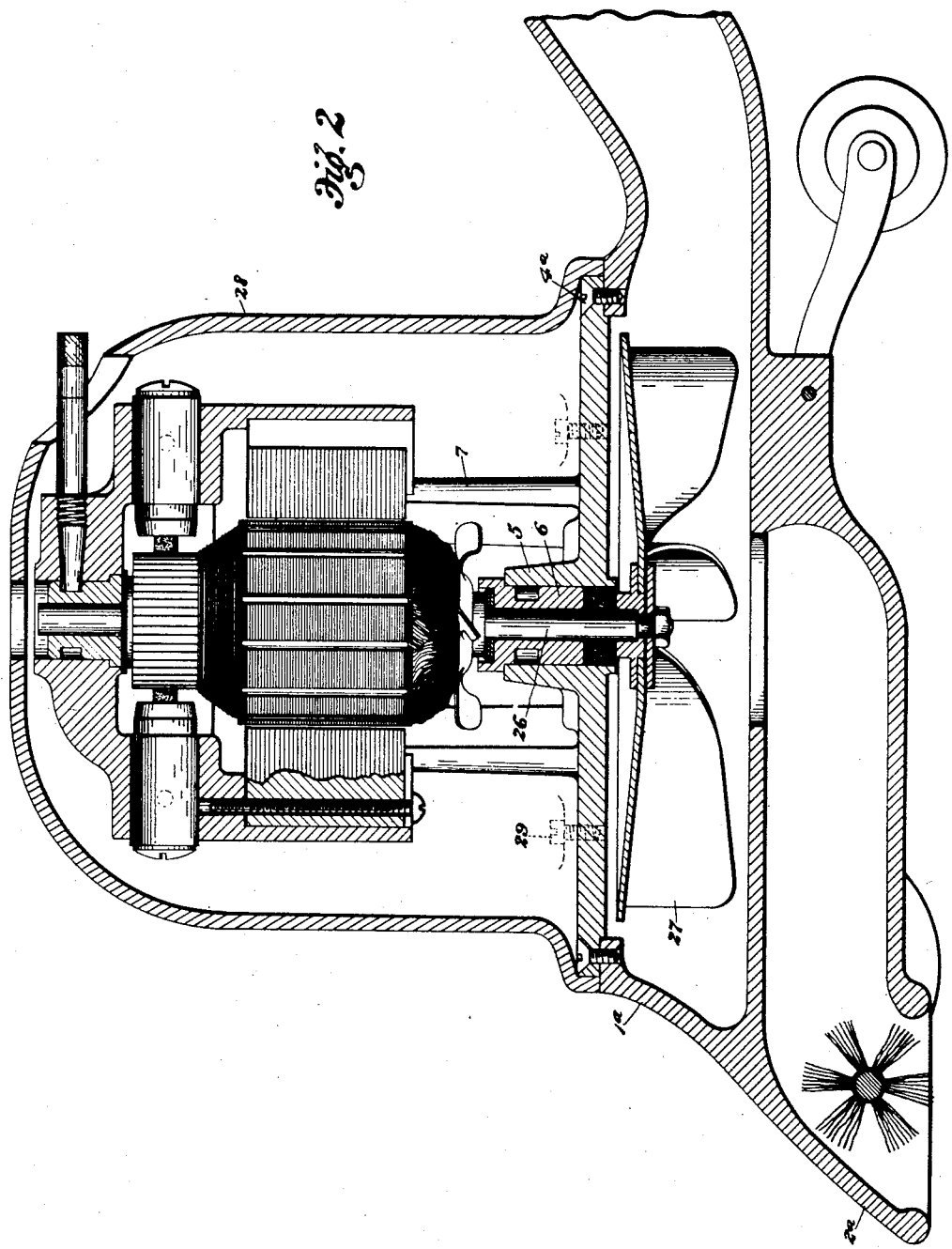
Figure 3:
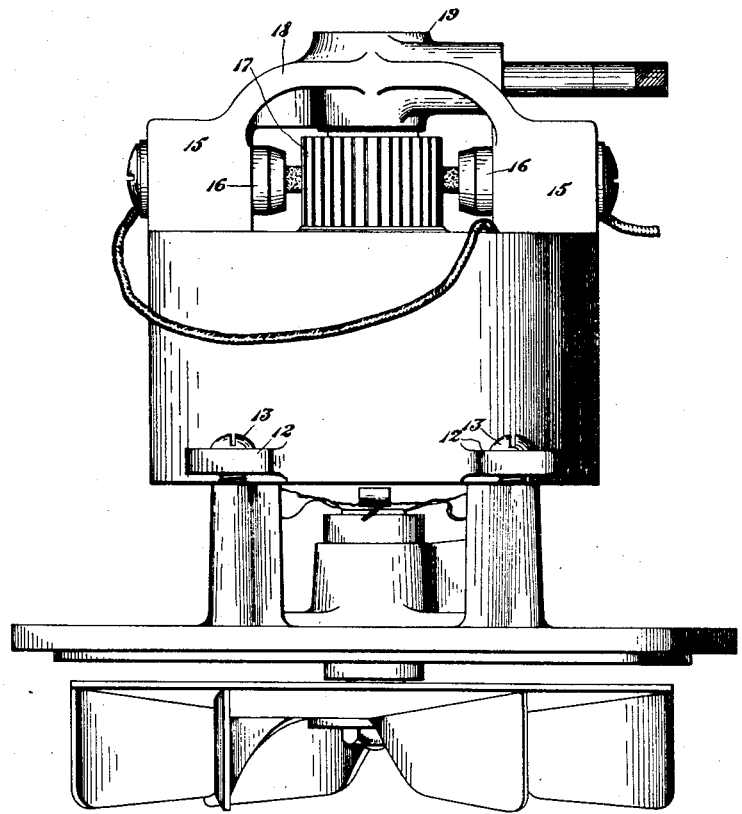
Figure 4:
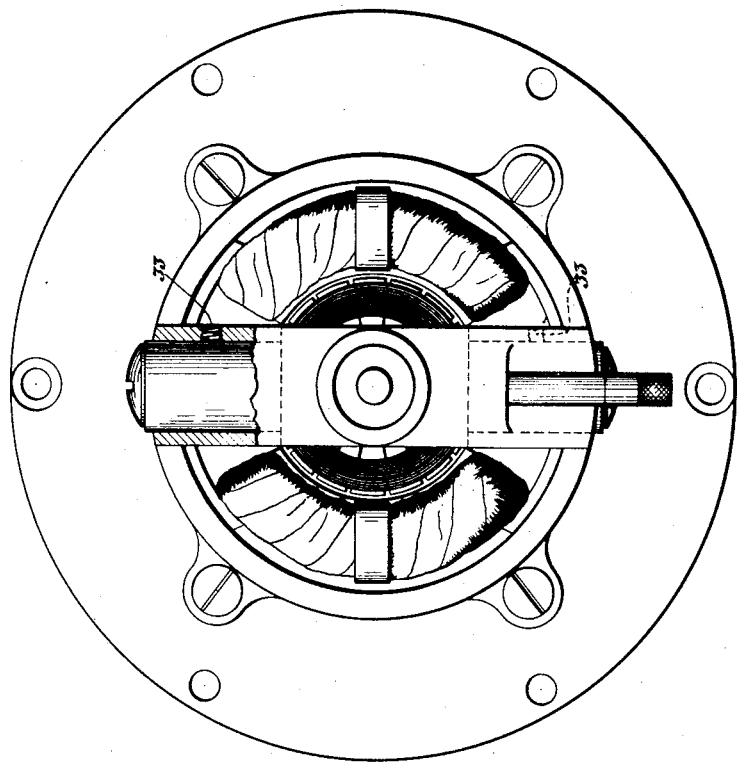
Figure 5:
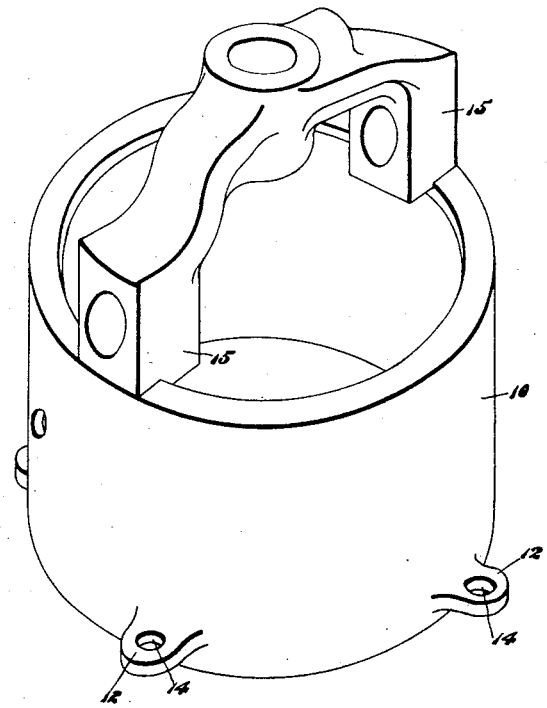

Figure 1 is a longitudinal section through a suction cleaner of the horizontal motor type showing a motor frame embodying the invention;

Fig. 2, a similar view through a suction cleaner of the vertical motor type;

Fig. 3, a side elevation of the motor frame and fan;

Fig. 4, a plan view of the motor frame;

Fig. 5, a perspective view of the motor frame detached; and

Figure 6:
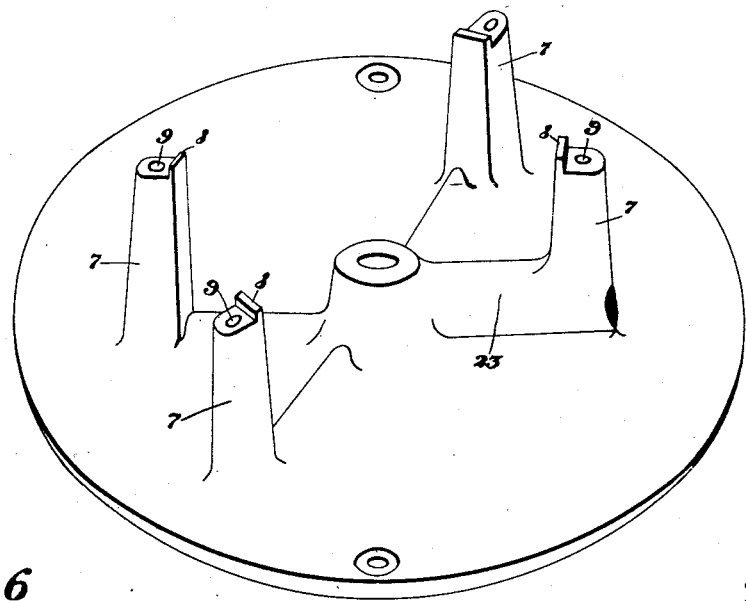

Fig. 6, a perspective view of the base plate detached.

Similar numerals of reference indicate corresponding views throughout the drawings.

In carrying out the invention as applied to a vacuum cleaner, the fan casing 1 or 1ª and the nozzle 2 or 2ª, may be of any usual construction of either the horizontal or vertical type of vacuum cleaner, as shown in Figs. 1 and 2 respectively.

The base plate 3 is attached to the fan chamber 1 or 1ª as by the screws 4 or 4ª and is provided with the central, cylindric portion 5 within which is mounted the lower or inner armature bearing 6. Posts 7 surround the cylindric portion 5 of the base plate and are provided at their upper or outer ends with the lugs 8, threaded longitudinal apertures 9 extending through the ends of said posts.

The frame includes the cylindric wall 10 within which the field core 11 is mounted, said cylindric portion being arranged to be seated upon the extremities of the posts engaging the lugs 8, radially disposed lugs 12 being provided around the periphery of said cylindric portion near the lower or inner end thereof, attaching screws 13 being passed through the apertures 14 in said lugs and into the screw threaded apertures 9 in the post 7 by means of which the cylindric portion of the frame is attached to the posts and supported thereon.

Tubular supports 15 are mounted upon the upper and outer end of the cylindric portion 10 for the reception of the brushes 16 which engage the commutator 17 in the usual manner.

A web 18 extends between the tubular supports 15 and has formed thereon the bearing support 19 within which the upper and outer bearing 20 is carried, a suitable oil cup 21 being located through the enlarged portion 22 of the web for lubricating the bearing 20. A similar oil cup, not shown, is preferably located through the tubular enlargement 23 upon the base plate for lubricating the inner or lower bearing 6.

The armature 25 may be of any usual construction, the inner or lower end of the shaft 26 thereof being journaled in the bearing 6, while the upper or outer end of said shaft is journaled in the bearing 20, the usual fan 27 being attached to the inner or lower extremity of said shaft within the fan chamber in the usual manner.

After the motor is thus assembled, the bell shaped motor casing 28 is placed over the motor and attached to the base plate as by the screws 29, this casing forming merely a cover for the motor.

By removing the motor casing or cover at any time, the motor may be operated and inspected, as the complete motor is assembled within the frame independently of the motor casing.

When it is desired to disassemble the motor, it is only necessary to remove the four screws 13 when the cylindric frame 10 may be lifted from engagement with the posts 7, the field core and brushes being removed with this cylindric frame. In order to remove the armature, it is only necessary to first disconnect the fan 27 therefrom.

In assembling the motor, the field core is slipped into place within the cylindric frame 10 and a threaded stud 30 is inserted through the threaded apertures 31 and 32 in the field and frame respectively, thus holding the core in proper relation to the brushes. The brush holders are then pressed into place in the cylindric openings in the frame provided therefor and are held in place by means of the headless screws 33.

The armature is then inserted through the field and into the upper bearing which has first been placed in position in the frame, after which the lower bearing is placed over the armature shaft and the cylindric frame attached to the base plate by means of the screws 13.

By this construction, it will be seen that the complete motor may be independently mounted and secured upon the frame and properly tested and assembled upon the casing of the vacuum cleaner, after which the motor casing or cover may be placed thereover or removed therefrom, without disturbing any part of the motor.

It will be evident from an inspection of the accompanying drawings and from the above specification that the motor casing is merely an ornamental covering for the motor, and does not contact with the motor at any point, thus preventing heating of the motor casing and allowing the same to remain cool during the operation of the motor.

We claim:—

1. A motor frame comprising a base plate having a bearing therein, post supports upon the base plate having a plurality of lugs arranged in a circle concentric with said bearing, a cylindric frame mounted upon the post supports and engaging said lugs, a field core within the cylindric frame, a web formed integrally with the cylindric frame and provided with a bearing concentric with the cylindric frame and an armature journalled in said bearings.

2. A motor frame comprising a base plate having a bearing therein, post supports upon the base plate, a cylindric frame mounted upon the post supports, means for aligning said cylindric frame concentric with the bearing, a field core within the cylindric frame, a web upon the cylindric frame, a bearing in the web concentric with the cylindric frame and an armature journaled in said bearings.

In testimony that we claim the above, we have hereunto subscribed our names.

WILLIAM J. WISE.
THOMAS O. ADAMS.